(12) United States Patent
Jain

(10) Patent No.: US 12,332,979 B2
(45) Date of Patent: Jun. 17, 2025

(54) SYSTEM AND METHOD FOR CONTROLLED USAGE OF LABORATORY EQUIPMENT

(71) Applicant: Manisha Jain, Ambala Cannt. (IN)

(72) Inventor: Manisha Jain, Ambala Cannt. (IN)

( * ) Notice: Subject to any disclaimer, the term of this patent is extended or adjusted under 35 U.S.C. 154(b) by 271 days.

(21) Appl. No.: 17/928,161

(22) PCT Filed: May 22, 2021

(86) PCT No.: PCT/IN2021/050500
§ 371 (c)(1),
(2) Date: Nov. 28, 2022

(87) PCT Pub. No.: WO2021/240538
PCT Pub. Date: Dec. 2, 2021

(65) Prior Publication Data
US 2023/0205854 A1 Jun. 29, 2023

(30) Foreign Application Priority Data
May 26, 2020 (IN) .............................. 202011021909

(51) Int. Cl.
*B01L 3/00* (2006.01)
*G06F 21/31* (2013.01)
(52) U.S. Cl.
CPC .............. *G06F 21/31* (2013.01); *B01L 3/545* (2013.01); *B01L 2200/141* (2013.01); *B01L 2300/021* (2013.01); *B01L 2300/023* (2013.01)
(58) Field of Classification Search
CPC .... G06F 21/31; B01L 3/545; B01L 2200/141; B01L 2300/021; B01L 2300/023
USPC ........................................................ 713/168
See application file for complete search history.

(56) References Cited

U.S. PATENT DOCUMENTS

| | | | |
|---|---|---|---|
| 9,626,609 B1* | 4/2017 | Ferguson | H04W 76/10 |
| 2014/0333412 A1 | 11/2014 | Lewis et al. | |
| 2018/0154867 A1* | 6/2018 | Golduber | G06Q 10/02 |
| 2018/0218466 A1* | 8/2018 | Mowatt | G06Q 30/0635 |
| 2018/0250093 A1 | 9/2018 | Frushour | |

OTHER PUBLICATIONS

Ahg, Lab Inventory Management, Lab Workflow And Traceability With Barcode Scanning, Feb. 4, 2020, https://web.archive.org/web/20200204010737/https://small-business-inventory-management.com/inventory-asset-tracking-for-industries/inventory-management-for-laboratories.htm (Year: 2020).*

* cited by examiner

*Primary Examiner* — Aftab N. Khan

(57) ABSTRACT

A method and a system for controlled usage of a laboratory glassware 123 comprises defining the usage control of the laboratory glassware 123, at a remote server 130, by receiving a first information from a computing device 120, and thereby generating a virtual stamp associated with the laboratory glassware 123. The first information is received over a communication link 160 from the computing device 120 by scanning a QR code associated with the glassware 123 using a scanning module 210 of the computing device 120. The remote server 130 allows an authorized user to define the usage control information in the virtual stamp for the controlled usage of the glassware 123.

17 Claims, 6 Drawing Sheets

SYSTEM AND METHOD FOR CONTROLLED USAGE OF LABORATORY EQUIPMENT

CROSS-REFERENCE TO RELATED APPLICATION

This application is the National Stage of, and therefore claims the benefit of, International Application No. PCT/IN2021/050500 filed on May 22, 2021, entitled "A SYSTEM AND METHOD FOR CONTROLLED USAGE OF LABORATORY EQUIPMENTS," which was published in English under International Publication Number WO 2021/240538 on Dec. 2, 2021, and has a priority date of May 26, 2020, based on application IN202011021909. Both of the above applications are commonly assigned with this National Stage application and are incorporated herein by reference in their entirety.

FIELD OF THE DISCLOSURE

Embodiments of the present disclosure in general, concern a system, and a method to enable controlled usage of laboratory apparatus. More particularly, embodiments of the present disclosure concerns to a system, and method for tracking and managing usage related information of the laboratory glassware/volumetric flask.

CROSS REFERENCE TO RELATED DISCLOSURE

This disclosure takes priority from an earlier filed Indian patent application no. 202011021909 filed on May 26, 2020; which is incorporated herein as reference.

BACKGROUND OF THE DISCLOSURE

The use of the laboratory glassware products such as flasks, beakers, funnels, vials, measuring cylinders, tubes, burettes, bottle, stoppers, etc. used in the research labs, pharma and/or chemical processing companies is well known in the prior art. Some items, for example, volumetric flasks, beaker, measuring cylinders, etc. can be used in a laboratory to carry out chemical, biochemical, biological or microbiological processes such as synthesis, sample preparation, and analysis. Many times, a laboratory glassware designed for one dedicated task (e.g., chemical testing of COVID-19) cannot be used for other types of experiments (such as normal blood testing). The output of the experiments leads to erroneous output or can cause fatal incidents if not employing the dedicated glassware designed for that purpose.

In the existing prior arts, many user such as, but not limited to, lab scientists, technicians, operators etc. are compelled to use traditional tracking methods such as, and without limitation, using sticky notes, writing on a glassware using a marker or a pen, using tying tags, using pasting stickers, and/or getting the matter printed using screening to track the usage of laboratory equipment. Existing approaches used in the prior arts make the glassware usage very specific since it can't be used for other experiments if the notes become permanent and can also introduce errors while usage as procedures like heating, autoclaving, acid wash, etc. Different users may need to remove the labels or tags on the glassware and would also need remove the write up on the flask again and again.

Hence, it is apparent that a need exists for the production of laboratory glassware with improved ease of usage. Therefore, it is desirable to receive appropriate and up-to-date usage instructions related to the laboratory glassware.

It is accordingly an object of the present disclosure to provide such laboratory equipment which can be communicatively connected to a computing device, for example in the form of a display.

The applicant has devised, tested and embodied the present disclosure to overcome the shortcomings of the state of the art and to obtain these and other purposes and advantages.

SUMMARY OF THE PRESENT DISCLOSURE

Therefore, an object of the present disclosure is to provide a laboratory glassware having a QR-code provided therewith so as to obviate the disadvantages associated with the prior art.

It is yet another object of the present disclosure to track and manage the usage related information of the laboratory equipment.

It is yet another object of the present disclosure to track and manage the time taken in an experiment which is carried out using the glassware with the V-stamp.

It is further object of the disclosure to group a batch of the glassware or using individual glassware for a particular experiment or using the glassware with a particular chemical, vaccine, diagnosis, etc. Also, the present disclosure enables a highly efficient method for tracking the usage of glassware. Further, the inventory of glassware inside lab or testing facility can be managed with the help of present disclosure.

It is yet another object of the disclosure to provide information regarding the number of cycles the glassware has gone through with complete history of chemicals and experiments the glassware has been used for. Further, it can provide information regarding the user who used it.

It is another object of the disclosure to keep check on the aging such as, but not limited to, depletion, calibration of the glassware.

It is another object of the disclosure to keep track on leaching such as, but not limited to, depletion, chemical reactive properties of the glassware.

It is yet another object of the disclosure to generate an alert to one or more users defined by the authorized user based on deviation from the standard usage instructions set by the authorized user or in case of non-compliance from standard usage instructions or defined parameters.

To achieve these objects according to an aspect of the present disclosure, a novel method and a system is devised for controlled usage of the laboratory.

This disclosure relates to a virtual stamp that can be applicable on all laboratory equipment (e.g., Volumetric Flask, Beaker, Measuring Cylinder, etc.). In this disclosure, a QR-LabGlass technology is used for printing the QR Code on the laboratory glassware. Also, the QR code associated with the glassware comprises at least an identifier that gives each glassware a unique identity. In another embodiment, the user (e.g., Lab, scientist, technician, operator) scans the QR Code on the glassware using a mobile, infrared scanner or any scanning hardware through a software application, App, Website or Desktop Software. Based on the scanning result of QR Code, registration of the glassware is checked on a remote server. If the glassware is not registered with the remote server and being used for the first time, then the authorized user configures the glassware in accordance with an authorization level of a particular authorized user id, and the like. Therefore, a Virtual Stamp is generated based on the authorized user input which consists of any number of fields such as, but not limited to, information regarding life cycle of the glassware, approved first use date of the glassware (start date), expiry date of the glassware (end date), allowed chemical details, forbidden chemical details, allowed number of experiment cycles, maximum time duration of the experiment to be performed using the glassware, allowed operating parameters, forbidden operating parameters, authorized user details, permittable usage cycles, or the like.

It is yet another object of the present disclosure to implement a method for defining the usage control of the glassware at a remote server by receiving a first information from a computing device and generating a virtual stamp associated with the glassware. The first information is received over a communication link by scanning a QR code associated with the glassware using a scanning module of the computing device, and the first information comprises a unique identifier indicating the identity of the glassware. Thereafter, the remote server allows an authorized user to define the usage control information in the virtual stamp for the controlled usage of the glassware. Further, the virtual stamp, comprising the defined usage control information for the glassware, is stored in a database associated with the remote server.

It is yet another object of the present disclosure to enable the controlled usage of the glassware. The remote server retrieves a virtual stamp and the associated usage control information stored in the database by receiving the usage information from the computing device. If the received usage information is in violation with the stored usage control information defined in the virtual stamp, the remote server generates an alarm. The alarm will notify the authorized user than an unauthorized attempt was made to access or update the usage control information related to a glassware. Also, the remote server is suitable configured to update usage information history in the virtual stamp in accordance with the current usage information received from the computing device. For example, virtual stamps provide information regarding the number of cycles the glassware has gone through with complete history of chemicals and experiments the glassware has been used for. Further, it can provide information regarding the user who used it. The virtual stamp can also keep check on the aging such as, but not limited to, depletion, calibration of the glassware, chemical reactive properties of the glassware and so on.

The present disclosure further enables an authorized person to modify and update the usage control information defined in the virtual stamp. A request to update the usage control information defined in the virtual stamp is received by the remote server from a computing device and it is determining by the remote server whether the user is the authorized user before updating the usage control information, wherein the user is determined as an authorized user if the valid authentication details are provided by the user. Thereafter, the remote server facilitates the authorized user to update the usage control information defined in the virtual stamp, for example, by providing a graphical user interface on the computing device which can be utilized by user of the computing device to modify the previously define usage control information in the virtual stamp. Once the one or more modifications related to the usage control information are received, the remote server is configured to update the virtual stamp by using the modified usage control information and the updated virtual stamp along with the modified usage control information is stored in a database by the remote server. In an embodiment, the various versions (ongoing as well as old versions) of the virtual stamp reflecting the modifications performed in the usage control information over a period of time are stored in the database, which can be accessed by the authorized users.

It is yet another object of the present disclosure to enable controlled usage of a glassware. The remote server receives a first information from a first computing device, wherein the first information is received by scanning a QR code associated with the glassware using the first computing device. The remote server then generates a virtual stamp associated with the glassware using the received first information and allows an authorized user to define usage control information in the virtual stamp for the controlled usage of the glassware. The virtual stamp, comprising the defined usage control information for the glassware, is stored in a database. When the remote server receives a current usage information related to the glassware from the first computing device or another computing device, it retrieves the virtual stamp associated with the glassware stored in the database. The remote server processes the received usage information by comparing the received usage information with the usage control information defined in the virtual stamp. Based on the result of the comparison, the remote server triggers an action which can be, but not limiting to, updating the usage control information or generation of an alarm to the authorized user.

These and other embodiments which characterize the disclosure are pointed out with particularity in the claims annexed hereto and forming a part hereof. However, for further understanding of the disclosure, its advantages and objectives obtained by its use, reference should be made to the drawings which form a further part hereof and the accompanying descriptive matter, in which there is illustrated and described embodiments of the disclosure.

BRIEF DESCRIPTION OF DRAWING

Embodiments of the present disclosure are best understood by reference to the figures and description set forth herein. All the aspects of the embodiments described herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, without departing from the spirit and scope thereof, and the embodiments herein include all such modifications.

DETAILED DESCRIPTION OF THE DRAWINGS

Embodiments of the present disclosure are best understood by reference to the figures and description set forth herein. All the aspects of the embodiments described herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit and scope thereof, and the embodiments herein include all such modifications.

Figure 1:
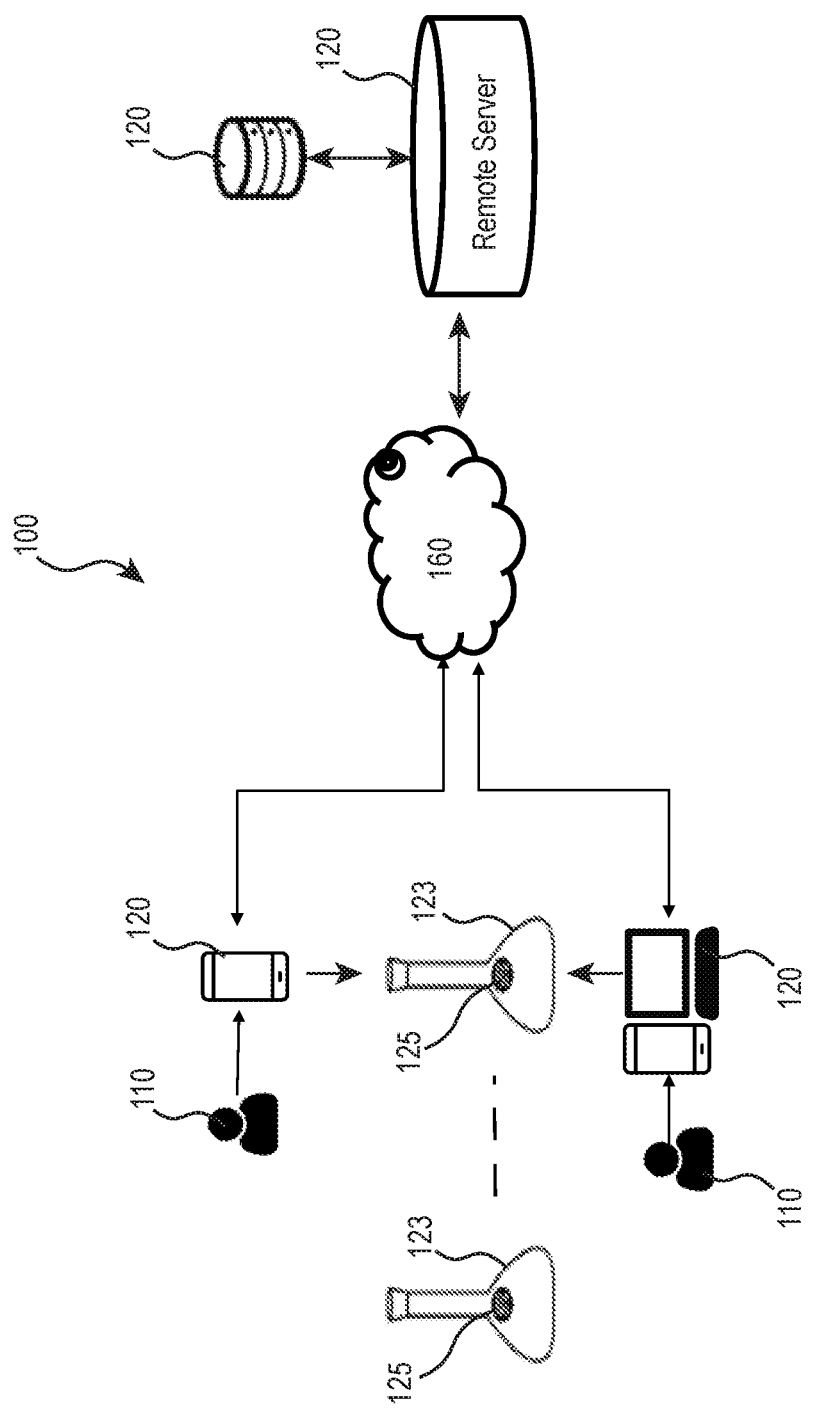
FIG. 1 discloses an exemplary environment 100 for controlled usage of one of more laboratory glasswares, in accordance with first embodiment of the present disclosure.

FIG. 1 discloses an exemplary environment 100 for controlled usage of one or more laboratory glasswares 123, in accordance with first embodiment of the present disclosure. The environment 100 comprises one or more computing devices 120, one or more laboratory glasswares 123 each provided with an identity stamp 125, and a remote server 130 communicatively coupled to the computing device 120. Further, the computing device 120 and the remote server 130 are connected to each other through a communication link 160. According to an embodiment, the remote server 130 is a cloud-based infrastructure. According to another embodiment, the remote server 130 is implemented over a local computer.

It is an object of the disclosure to maintain and provide usage information history of the glassware to one or more authorized users 110 over their respective computing devices 120, wherein the usage information history comprises one or more fields reflecting past usage information of the glassware 123. For example, the usage information history comprises information such as, and without limitation, date and time of the glassware usage, experiment details, details of the person who performed the experiment, chemicals used in the glassware, operating conditions related to the experiments, experiment duration, count of usage cycles, experiment output, issues, and/or any other comments/notes related to the experiments. It is another main object of the disclosure, to allow an authorized user to define standard usage control information for one or more glasswares to enable the controlled usage of each of the glassware 123 without departing from the standard usage control information defined thereof. It is another primary object of the present disclosure to generate a unique virtual stamp corresponding to each of the glassware 123, wherein the virtual stamp comprises standard usage control information defined for that glassware, the usage information history of the glassware, or combination thereof.

The aforementioned objects of the present disclosure are achieved by providing an identity stamp 125 on each of the glassware 123 and by using the remote server 130 which is configured to generate and store the virtual stamp comprising usage control information along with the usage information history related to each glassware 123.

According to preferred embodiment of the present disclosure, identity stamp 125 is a unique QR code associated with each of the glassware 123. The identity stamp 125 comprises at least an identifier that represents a unique identity of the glassware 123. According to an embodiment, a plurality of glasswares 125 related to single batch can be allocated to a single identity stamp 125. According to another embodiment, the laboratory glassware 123 can be provided with various other identity stamps 125 such as, but not limited to, bar code, Aztec code, Aztec rune, Code one, Data matrix code, DotCode, Grid matrix code, Han Xin Code, iQR code, Micro QR code, Model 1 QR, EAN-13/JAN, EAN-8, EAN-5, Code 25 Interl. (ITF), Code 25 Industrial, CPC-A, CPC-E, Codebar, Cod 39, Code 93, Code 128, RSS-14/GS1 Databar, Aztec, Data Matrix, PDF417, Micro PDF417, Bluetooth chip, RFID, NFC, or combination thereof. According to another embodiment, the laboratory glassware 123 also comprises sensors such as, and without limitation, motion sensor, proximity sensor, vibration sensors, pressure sensor, gyroscopes, chemical sensor, color sensor, acoustic sensors, temperature sensor, micro-camera, or the like which provides information regarding the current usage of the glassware, and a suitable action such as triggering an alarm in case of a warning event. In an exemplary scenario, the glassware 123 may store a sample of an infectious virus (e.g., SARS virus, COvid-19 virus, etc.) and may be locked for any further unauthorized and unsafe usage. However, if the one or more sensors mounted on the glassware determines a potentially dangerous situation (e.g., unauthorized usage of the glassware detected by one or more sensors) then an alarm can be generated (e.g., notifications/SMS/calls/buzzer/audio-visual alarm/push notifications, etc.) and transmitted to one or more users to indicate the identified potentially dangerous situation.

According to an embodiment, in case a glassware is damaged, then a designated authorized user (e.g., administrator, lab manager, quality check manager) is allowed to reassign its associated virtual stamp information comprising usage control information along with the usage information history to a new glassware by linking identity stamp of the new glassware with the virtual stamp information of the broken glassware.

Further, the computing device(s) 120 refers to a device which is used by user(s) 110 to scan the identity stamp 125 embedded on the glassware 123. The user 110 can be such as, but not limited to, a technician, a lab operator, a scientist, a researcher, a technologist, an examiner, a chemical expert, etc. The computing devices 120 can be such as, but not limited to, a smart phone, a hand-held phone, a personal digital assistant (PDA), a tablet computer, a desktop computer, a portable scanner, a laptop computer, or other similar device without departing from the spirit and scope of the present disclosure.

The computing device 120 can be used to communicate a first information related to the laboratory glassware(s) 123 to the remote server 130 through the communication link 160. The first information represents information retrieved by scanning the identity stamp 125, embedded or imprinted on the glassware 123, by the user 110 using the computing device 120. In an embodiment, first information comprises a unique identifier associated with the glassware 123, which is retrieved by using the computing device 120 by scanning the identity stamp 125 embedded/imprinted on the glassware 123.

The computing device 120 can include a scanner module (not shown) such as, but not limited to, a digital camera, a webcam, an optical scanner etc. which can be used to scan the identity stamp 125.

In one exemplary embodiment, the user 110 scans the identity stamp 125 embedded on the glassware 123 using a software application installed in the computing device 120. In another embodiment, the user 110 can visit a website/ webpage using a browser application running on the computing device 120. The website/webpage can be hosted on the remote server 130 or a third party web-server. Further, the website/webpage can facilitate the triggering of the scanning module of the computing device 120 to facilitate the scanning of the identity stamp 125 associated with the glassware 123.

The first information or any other information can be shared between the remote server 130 and the computing devices 120 by using the communication link 160, wherein the communication link 160 can be such as, but not limited to, Wi-Fi, cellular network, Local Area Network (LAN), Wide Area Network (WAN), Metropolitan Area Network (MAN), PSTN, internet, GPRS, GSM, CDMA network, Ethernet, fiber optics, and so forth.

In another exemplary embodiment of the present disclosure, the remote server 130 refers to a server which is configured to generate and store virtual stamp related to the plurality of glasswares 123 and maintain the updated usage information history of the plurality of glasswares 123. The remote server 130 enables the real-time tracking of the usage of the glassware and also ensures the delivery of the usage information history to the requesting computing devices. The remote server 130 further comprises a database 140 configured to store one or more virtual stamps comprising usage control information, and/or usage information history for the plurality of the glasswares 123. In an embodiment of the present disclosure, the database 140 is an integral part of the remote server 130. In another embodiment of the present disclosure, the database 140 can be located external to the remote server 130.

The remote server 130 is suitably designed and configured to implement the controlled usage and tracking of the laboratory glasswares 123. The remote server 130 receives the first information from the computing device 120, wherein the first information comprises a unique identifier associated with the laboratory glassware 123. Based on the received unique identifier associated with the glassware 123, controlled usage parameters and usage information history related to the glassware 123 is checked by the server 130 in the database 140. In an embodiment, if the glassware 123 not registered in the database 140 and being used for the first time, then the remote server 130 facilitates the user 110 to register the glassware 123 by defining usage control information related to the glassware 123. According to an embodiment, the information stored in the database (e.g., virtual stamp(s) comprising usage information history and/or usage control information) is stored in encrypted format.

According to an embodiment, many changes and modifications may be made within the scope of the embodiments herein, without departing from the spirit and scope thereof, and the embodiments herein include all such modifications. For example, functionalities performed by the remote server 130 related to controlled usage of one or more glasswares can be implemented by using a suitable computer program product which is executed by the processing unit 202 of the computing device 120 to perform various actions related to controlled usage of one or more glasswares 123. According to this particular embodiment, the functionalities of remote server 130 and the database 140 can be executed by the computing devices 120 using their processing units 202 and the internal storage memory 204.

According to an embodiment, the user 110 is authenticated before being granted the permission to register and define the usage control information related to the glassware 123. In response to an authentication request by a user (for example, by selecting a sign-in icon displayed on the graphical user interface of the computing device 120), the computing device 120 may be programmed to send a request containing login credentials to the remote server 130 to authenticate the user 110.

In response to such a request, remote server 130 may query one or more authentication sources (not shown) for information indicating the identity of the user 110. In other embodiments, authentication sources may comprise databases storing login credentials, biometric signatures, smart-card data and/or the like. According to another embodiment, authentication sources may comprise any one of several commercially available authentication services. However, these are merely examples of authentication sources comprising information that may be used to verify an identity of a user and claimed subject matter is not limited in these respects.

In some exemplary embodiments, the users 110 can be authenticated using any one of several methods such as, but not limited to, comparing an individual's physical appearance with a government issued picture identification document, comparing a username and password entered in a computer system to pre-stored information, comparing provided information with unique known identification information, comparing information from a portable electronic device to a known sequence of numbers, and/or comparing a biometric specimen (fingerprints, retina, etc.) and/or sample with a biometric signature. However, these are merely examples of methods that may be used for authentication and claimed subject matter is not limited in these respects.

Once the user 110 is found to be successfully verified, the remote server 130 is suitable programmed to register the glassware 123 in the database 140 and a virtual stamp (V-stamp) is generated based on authorized user's input which comprises of any number of fields such as, but not limited to, usage control information, wherein the usage control information can be such as, but not limited to, information regarding life cycle of the glassware, approved first use date of the glassware (start date), expiry date of the glassware (end date), allowed chemical details, forbidden chemical details, allowed usage cycles, maximum time duration of the experiment to be performed using the glassware, allowed operating parameters, forbidden operating parameters, authorized/unauthorized user details, glassware safe/un-safe operating conditions, glassware tolerance information, glassware calibration information, and chemical/vaccine to be used in the glassware or the like. Also, the virtual stamp also maintains usage information history related to the usage of the glassware, wherein usage information history comprises one or more fields reflecting past usage information of the glassware 123. For example, the usage information history comprises information such as, and without limitation, date and time of the each experiment performed using the glassware, experiment details, details of the person who performed the experiment, chemicals used in the glassware, operating conditions related to the experiments, experiment duration, experiment output, issues faced, and/or any other comments/notes related to the past experiments performed using the glassware. In an embodiment, the information stored in the usage information history comprises timestamped data collection indicating the previous usage of the glassware and/or timestamped information regarding the alarms/alerts generated. According to an embodiment, the usage information history further includes multimedia information, e.g., one or more images reflecting the glassware usage with timestamp data, video feed of the laboratory premise indicating the glassware usage with timestamp data, or the like. In an exemplary scenario, when an unauthorized usage related to the glassware usage is detected, a video feed (or images) can be captured using one or more capturing devices available inside the laboratory premises and the captured video feed is stored inside the usage information history in encrypted format for further perusal and scrutiny.

According to an embodiment, the virtual stamp further include usage manual or guidance manual of the glassware 123 in text, audio, visual or any other multimedia format, information regarding how to maintain the glassware 123 in text, audio, visual or any other multimedia format, or any other checklist/standard-operating procedures for the safe usage of the glassware 123 in text, audio, visual or any other multimedia format. The information stored inside the virtual stamp provides easy access to precision level, tolerance level, certificate of calibration, and/or conformity of the glassware 123.

According to an alternate embodiment, the usage information history may not be stored inside the virtual stamp, but it may be maintained separately in a database (e.g., 140) and is associated with the corresponding virtual stamp of the glassware 123. The virtual stamp related to each of the glassware is linked with the identity of the respective glassware 123 so as to ensure convenient retrieval of the usage tracking information of the glassware 123.

In an embodiment, if the glassware 123 is already registered in the database 140 then the usage information history regarding the glassware 123 can be retrieved by the user 110 on request for example, by scanning the identity stamp 125 associated with the glassware 123 by using the computing device 120 and thereby transmitting the usage history retrieval request to the remote server 130. According to an embodiment, the remote server 130 is programmed to transmit the usage information history corresponding to the glassware 123 after authenticating the user 110.

More details on the functioning of the computing devices 120, and remote server 130 are provided further in conjunction with FIGS. 2-6 of the present disclosure.

Figure 2A:
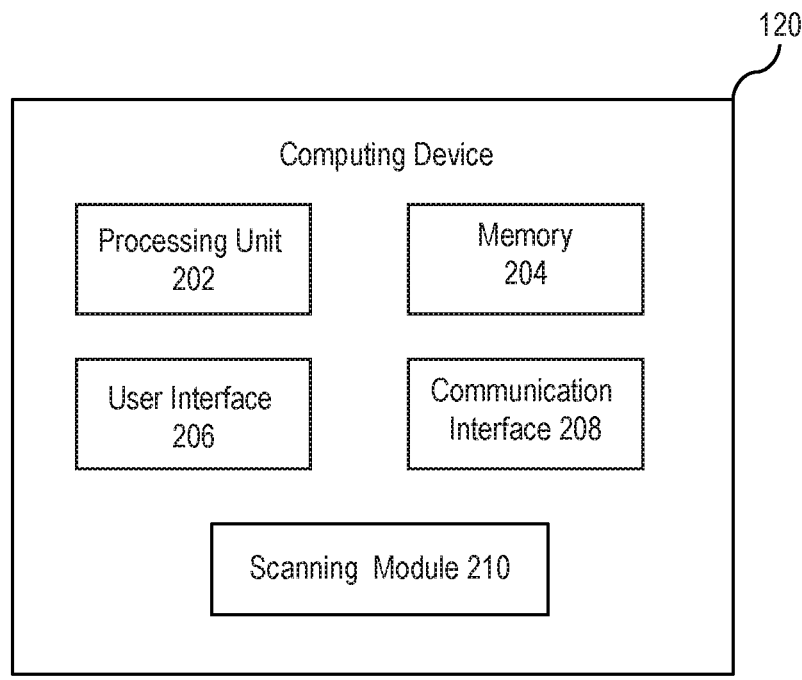
FIGS. 2A & 2B illustrates exemplary block diagram of a computing device which can be implemented in various embodiments of the present disclosure.

FIG. 2A shows a block diagram of the computing device 120 in accordance with a preferred embodiment of the present disclosure. The computing device 120 comprises a processing unit 202 configured to perform various processing functions of the computing device 120. The computing device 120 further comprises a memory 204 which stores instructions related to the application program and the user data. In an embodiment, the application program can be operated in multiple languages.

The processing unit 202 interacts with the memory 204 to execute the instructions stored on the memory 204 to run the application program such as software application, website or desktop software, web-browser, etc. to define the usage control information and/or current usage information related to the glassware and transmit the same to the remote server 130.

In one exemplary embodiment of the present disclosure, the memory 204 is internal and non-removable memory. According to another embodiment of the present disclosure, the memory 204 is a removable memory. The memory can be, but not limited to, volatile memory, non-volatile memory, RAM, DRAM, SRAM, ROM, EPROM, EEPROM, hard drive, magnetic memory, optical memory, flash memory, USB storage, data card, SD card, or any other memory known in the prior art.

In one embodiment of the present disclosure, the application program is downloaded from the internet and installed on the computing device 120. In another embodiment of the present disclosure, the application program is pre-installed or in-built in the computing device 120.

In an exemplary embodiment of the present disclosure, the computing device 120 is installed with a service application (not shown). In an embodiment of the present disclosure, the service application may be implemented as an application program (or combination of software and hardware). Further, the service application installed in the computing device 120 is configured to connect the computing device 120 with the remote server 130 via the communication link 160.

The computing device 120 comprises of a communication interface 208 for performing communication with other computing devices 120 and the remote server 130. The communication interface 208 can be, but not limited to, Ethernet port, Bluetooth, WiFi, LAN interface, NFC, Zigbee, Infrared port, cellular interface, radio interface, fiber optic port, USB port, IEEE compliant interface or any other method known in the prior art.

The computing device 120 receives user inputs via user interface 206 as shown in the FIG. 2A. The user interface 206 can be any interface known in the art, such as, Graphical User interface (e.g., LCD, LED display, etc.), touchscreen, keyboard, mouse, keypad and combination thereof.

In one embodiment of the present disclosure, the computing device 120 comprises a scanner module 210 such as, but not limited to, a digital camera, a webcam, an optical scanner etc. The scanning module 210 can be internal or external to the computing device 120. Based on user inputs, the scanning module 210 scans the QR Code (e.g., identity stamp) 125 on the glassware 123 using a camera, infrared scanner, optical scanner or any scanning hardware and a corresponding software application.

Figure 2B:
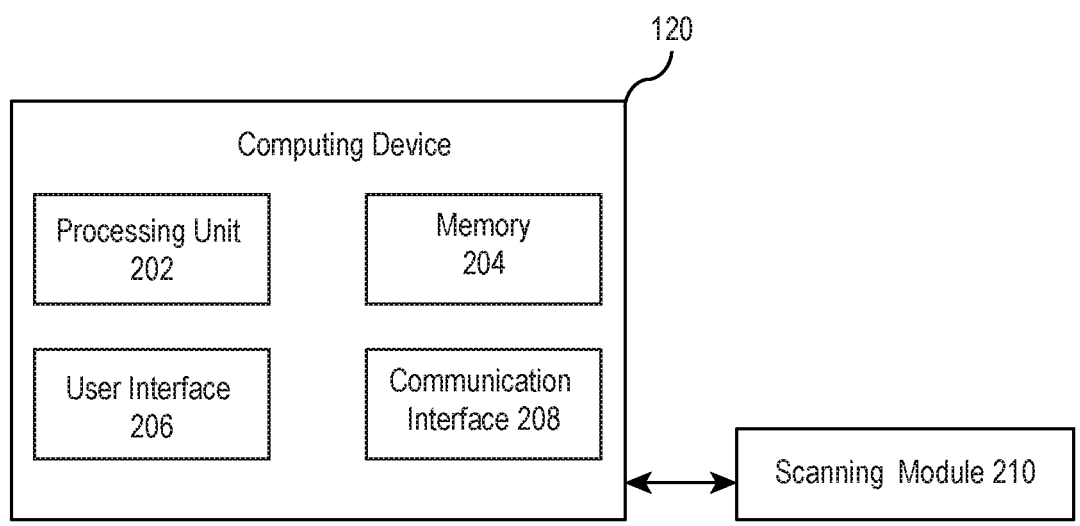

Similar computing device 120 is illustrated in FIG. 2B in accordance with another embodiment of the present disclosure.

In the embodiment as illustrated in FIG. 2A, the computing device 120 is entirely self-contained and integrated into a single housed unit, whereas in contrast the computing device 120 as illustrated in FIG. 2B comprises a separate scanner coupled with a computing device by way of cables or wireless means. In variations of the scanning device 210, the device can be portable and lightweight to allow it to be easily transported from location to location without the need to also carry a personal computer. In certain variations, the device can be battery powered to permit field use where electrical outlets are not conveniently available.

Figure 3:
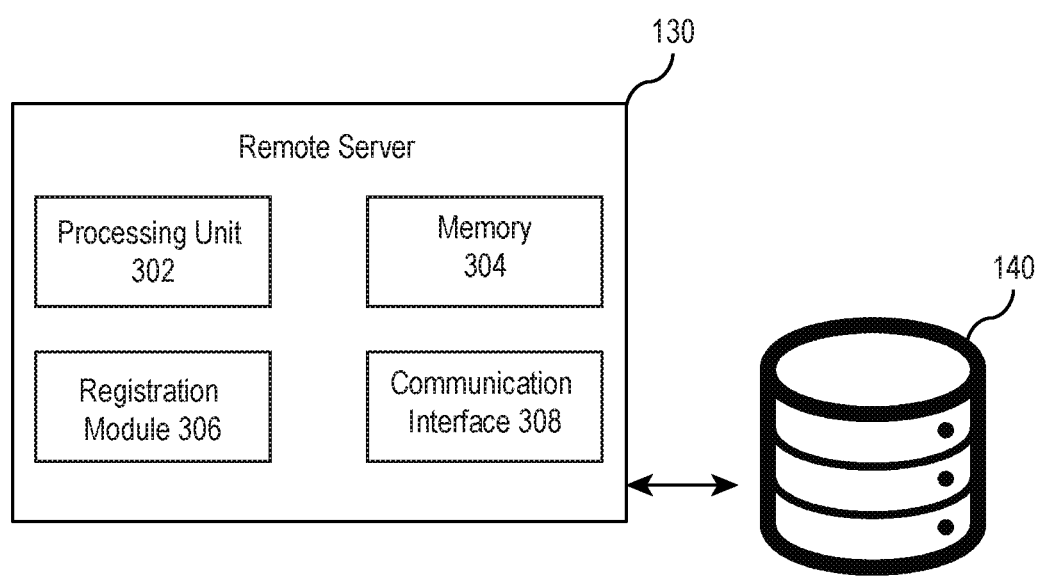
FIG. 3 illustrates exemplary block diagram of a remote server which can be implemented in various embodiments of the present disclosure.

FIG. 3 shows a block diagram of the remote server 130 in accordance with a preferred embodiment of the present disclosure. The remote server 130 comprises a processing unit 302 for performing various functions of the remote server 130. The remote server 130 further comprises an internal memory 304 which stores a suitably programmed computer program product which when executed by the processing unit 302 performs the various controlled usage related functionalities of the remote server 130. The remote server 130 further comprises a communication interface 308 and is communicatively coupled to the computing device 120 via communication link 160, wherein the communication link 160 can be such as, but not limited to, Wi-Fi, cellular network, Local Area Network (LAN), Wide Area Network (WAN), Metropolitan Area Network (MAN), PSTN, internet, GPRS, GSM, CDMA network, Ethernet, fiber optics, and so forth.

Further the remote server 130 comprises an authentication module 306 for performing authentication of the authorized user. Here, for example, the application program may request the authentication module 306 of the remote server 130 to authenticate the user 110. In response to such a request, the authentication module 306 of the remote server 130 may query one or more authentication sources (not shown) for information indicating the identity of the user. In one embodiment, authentication sources may comprise any one of several commercially available authentication services. In other embodiments, authentication sources may comprise databases storing biometric signatures, smartcard data and/or the like. However, these are merely examples of authentication sources comprising information that may be used to verify an identity of a user and claimed subject matter is not limited in these respects.

Based, at least in part, on information from authentication sources and in response to the authentication request from the application program, the authentication module 306 of the remote server 130 may determine whether or not a user 110 can be authenticated successfully. Upon authenticating a user 110, remote server 130 may transmit a true response of this authentication of the user back to the application program.

The remote server 130 also includes a database 140 which can be coupled with the remote server 130 or can be placed at a remote location. The database 140 placed at the remote location is in communication with the remote server 130 using industry standard communication means.

A virtual stamp corresponding to each glassware is generated and stored in the database 140, by the remote server 130, wherein the virtual stamp comprises usage control information based on the authorized user's input (e.g. administrator's inputs) which consists of any number of fields indicating usage control information such as, but not limited to, information regarding life cycle of the glassware, approved first use date of the glassware (start date), expiry date of the glassware (end date), allowed chemical details, forbidden chemical details, allowed number of experiment cycles, maximum time duration of the experiment to be performed using the glassware, allowed operating parameters, forbidden operating parameters, authorized user details, or the like.

The database 140 can also be linked with third-party servers. The users of the third-party servers can be provided with authentication credentials to access the database 140. Such an approach is beneficial in scenarios where the laboratory equipments 123 are licensed to third party users. In an embodiment, the information stored in the database 140 (e.g., virtual stamp containing controlled usage information and/or the usage information history corresponding to each unique identifier associated with the glassware) is suitably encrypted to ensure protection to the information.

Figure 4:
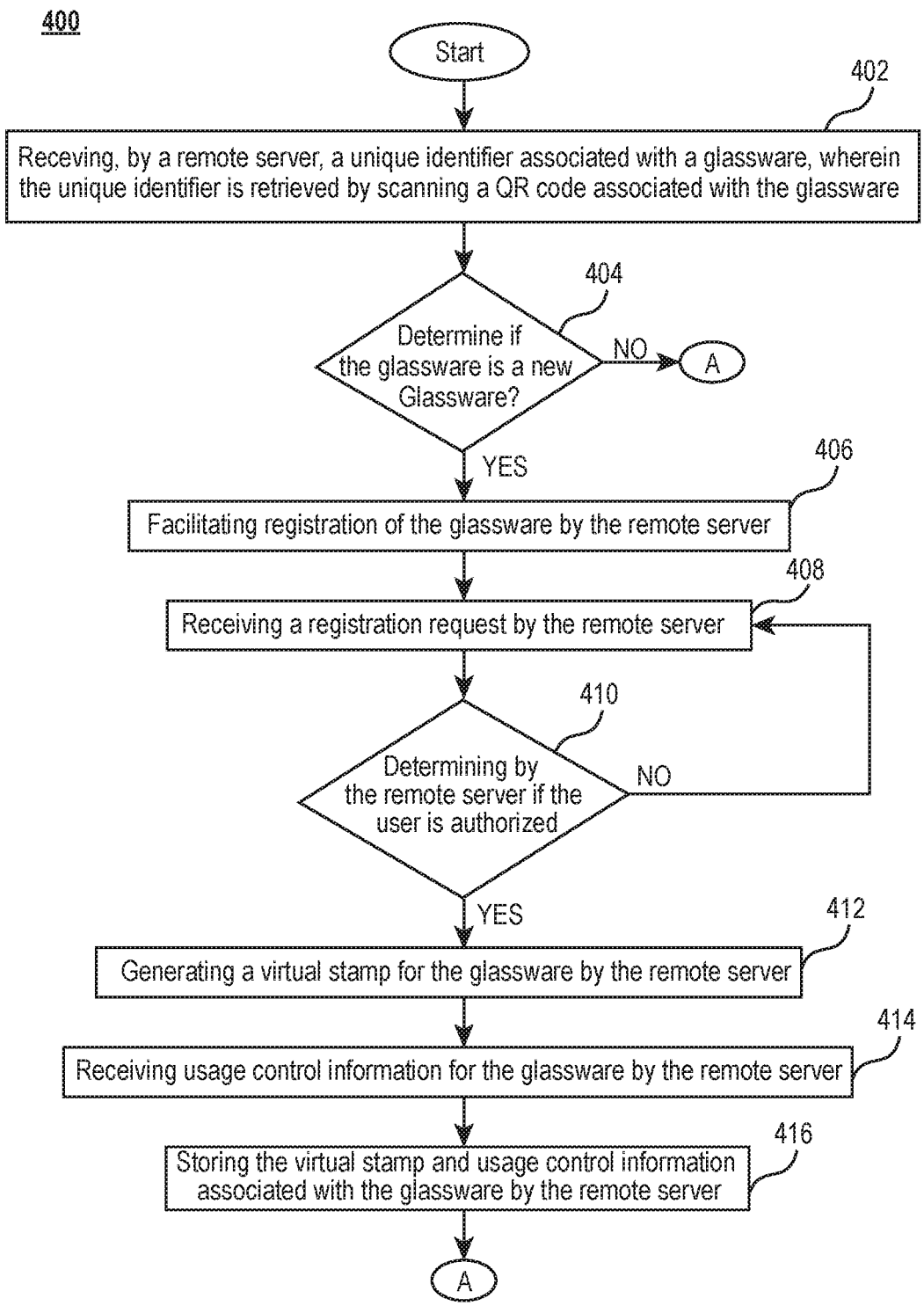
FIG. 4 is a flowchart illustrating an exemplary workflow for configuring the laboratory glassware and defining the usage control information, according to an embodiment of the present disclosure.

FIG. 4 shows the method 400 for defining the controlled usage information for one or more laboratory equipments (e.g., glasswares) by one or more users 110 by using their respective computing devices 120, according to an embodiment of the present disclosure. In a particular embodiment, although the claimed subject matter is not limited in this respect, some portion of process embodiment 400 may be executed and/or performed by a suitably configured remote server 130 and/or a portion of process may be implemented by the computing device 120.

The process begins at step 402, wherein the remote server 130 is configured to receive a unique identifier associated with a glassware 123 from the computing device 120. According to an embodiment, the unique identifier is retrieved by the computing device 120 by scanning a QR code (e.g., identity stamp) 125 associated with the glassware 123. In an exemplary embodiment, the QR code 125 is imprinted on the glassware 123 and is scanned using a scanning module 210 (e.g., camera or image capturing device or webcam or optical scanner etc.) of the computing device 120. The computing device 120 and the remote server 130 communicate with each other and/or shares the retrieved unique identifier associated with the glassware 123 by using their respective communication interfaces. The communication interface (208, 308) of the computing device 120 and/or the remote server 130 can be, but not limited to, Ethernet port, Bluetooth, WiFi, LAN interface, NFC, Zigbee, Infrared port, cellular interface, radio interface, fiber optic port, USB port, IEEE compliant interface or any other method known in the prior art.

According to an embodiment, the computing device 120 is configured to run an application program which when executed by the processing unit 202 of the computing device 120 performs at least: facilitating the scanning of the QR code 125 associated with the glassware 123, retrieving an unique identifier embedded within the scanned QR code 125, and transmitting the retrieved unique identifier to the remote server 130 using the communication interface 208. The application program may facilitate the scanning of QR code 125 associated with the glassware 123 in response to an event such as, for example, a selection from a user interface 206 by the user 110. However, this is merely an example of an event that may initiate the execution of the application program to scan the QR code 125 and claimed subject matter is not limited in these respects.

According to another embodiment, the computing device 120 is configured to share the unique identifier associated with the glassware 123 by visiting a website using a browser application installed on the computing device, wherein the website is hosted on the remote server or a third party web-server, wherein the website is suitably configured to facilitate the scanning of the QR code 125 associated with the glassware 123 and transmission of the unique identifier retrieved thereof with the remote server 130.

At decision block 404, remote server 130 is configured to determine whether the unique identifier associated with the QR code 125 embedded on the glassware 123 is stored in the database 140 associated with the remote server 130. The process is accomplished by comparing the retrieved unique identifier associated with glassware 123 with the previously registered identifiers associated with their respective glasswares 123. If the unique identifier is found in the database 140, it will indicate that the glassware 123 is already registered on the remote server 130, then the user 110 will follow the process A, wherein suitable options regarding the controlled usage tracking of the glassware can be provided to the user which are described in detail in FIG. 5. If the unique identifier is not found, it will indicate that the glassware 123 is not registered in the database 140 of remote server 130 and is being used for the first time, as determined at decision block 404, thereafter the remote server 130 will facilitate the registration of the glassware 123, in step 406. For example, the remote server 130 facilitates display of a graphical user interface on the computing device 120 to allow the user to make selection regarding the registration of the glassware 123.

At step 408, the remote server 130 receives a registration request from the computing device 120. For example, the authentication module 306 of remote server 130 receives the user's information/credentials to determine the user's authenticity. The authentication module 306 of the remote server 130 obtains the user information which is indicative of a user's identity. In one embodiment, the remote server 130 may prompt or request the user 110 for user information comprising credentials such as, for example a user ID and password. Based on the received request, the user 110 of computing device 120 transmits the appropriate user information/credentials to the authentication module 306. Again, however, these are merely examples of user information that may be indicative of a user's identity and claimed subject matter is not limited in these respects.

At decision block 410, the remote server 130 will determine the authenticity of the user 110 using authentication module 306. The database 140 of remote server 130 stores multiple entries of user's information templates and associated data values for different users 110. The remote server 130 compares the received user's information with pre-stored information of different authorized users. In other embodiments of the present disclosure, the authentication module 306 may obtain user information such as organization's biometric information database and compare the same with the user's biometric information. The remote server 130 may be configured to receive information from external sources as current usage related information, such as, and without limitation, information obtained from laboratory video feed, biometric information sources, and/or company attendance system, and compare that with the user's information to verify the authenticity of the user. Based on the comparison, the remote server 130 decides whether the user 110 is an authorized user or not. Based on the result, if the user 110 is not an authorized user, the control will shift back to step 408 for receiving the authorized credentials or details. If the user is an authorized user, then the process proceeds ahead to step 412.

At step 412, a virtual stamp by the remote server 130 is generated corresponding to the glassware 123, wherein the virtual stamp is linked to unique identifier of the glassware. The virtual stamp is used to store usage control information related to the usage glassware 123.

At step 414, the remote server 130 will receive the usage control information to be associated with the virtual stamp for the controlled usage of the glassware 123, wherein the usage control information comprises such as, but not limited to, alert triggering criteria, usage locking parameters, information related to life cycle of the glassware, usage start date of the glassware, end date of the glassware, shelf life of the glassware, users authorized for the usage of the glassware, experiments allowed to perform using the glassware, or chemical or vaccine to be used in the glassware, number of cycles the glassware is allowed to go through, glassware aging, depletion, calibration of the glassware, chemical reactive properties of the glassware and so on. Further, the user 110 can also define a locking condition while defining the usage control information of the virtual stamp associated with the glassware 123. The locking condition may include parameters such as, but not limited to, time, purpose, name of the experimenter and so on. For example, a specific glassware 123 may be assigned for a specific experiment. The user may define the locking period in order to prevent the usage of the glassware 123 for other experiments other than the specific experiment defined in the condition. Such information is stored in the virtual stamp associated with the unique identifier of the scanned QR code associated with the glassware 123 in the database 140 in communication with the remote server 130.

Thereafter, at step 416, the remote server 130 is configured to store the virtual stamp comprising the usage control information associated with the glassware 123 mapped with the unique identifier of the glassware 123 in the database 140.

According to an embodiment of the present disclosure, although the claimed subject matters is not limited in this respect, all or a portion of process 400 may be executed on a computing device platform (e.g., notebook computer, personal digital assistant, cell phone, and/or the like). In one particular embodiment, such a computing device platform may be capable of hosting "rich-client" applications that are hosted on the computing device platform. Alternatively, the computing device platform may enable a user to interact with web applications through the communication interface.

According to another embodiment of the present disclosure, the steps 412 and 414 can be performed in any order, depending on the implementation of the process. For example, the user may input the usage parameters for the glassware 123 at step 412. Based on the input usage parameters, the virtual stamp may be generated for the glassware 123. Therefore, the steps are interchangeable and are not intended to limit the scope of the disclosure.

Figure 5:
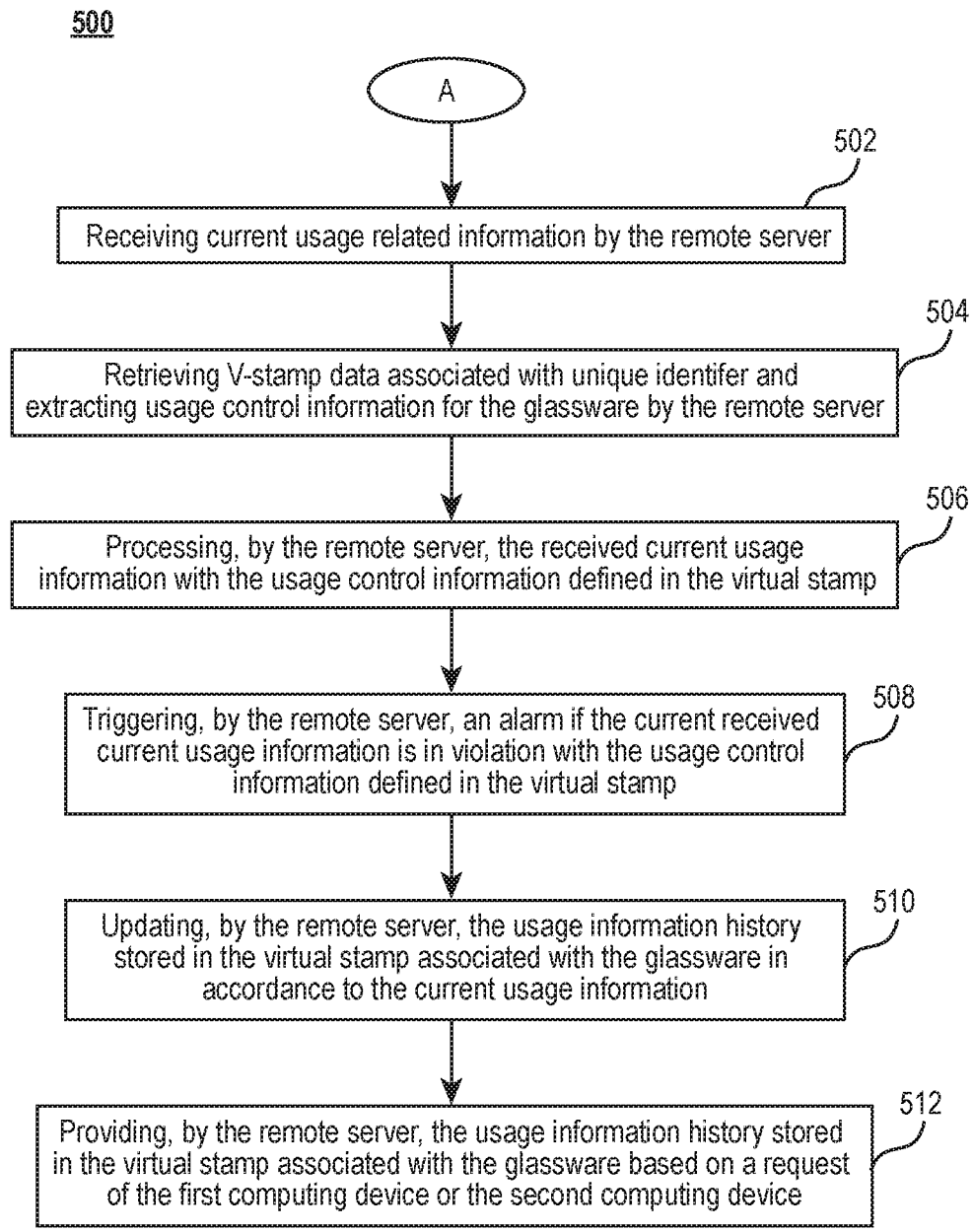
FIG. 5 is a flowchart illustrating an exemplary workflow for enabling controlled usage of the laboratory glassware, according to an embodiment of the present disclosure.

The method for enabling controlled usage of the laboratory glassware 123 by the remote server 130 is illustrated by flowchart 500 of FIG. 5. The process may begin, at step 502, when a unique identifier associated with the glassware 123 that is previously registered in the database 140 is received by the remote server 130. In another embodiment, a request related to current usage information is received, by the remote server 130, from a computing device 120 containing a unique identifier associated with the glassware 123. Once it is determined that the unique identifier associated with glassware 123 is already configured and/or registered in the remote server 130, process moves ahead to step 502, where the user 110 associated with computing device 120 is facilitated, by the remote server 130, to provide the current usage related information of the glassware to the remote server 130. The current usage information related to the glassware 123 comprises details such as, but not limited to, information related to ongoing experiments, experimenters' details, date and time related information, chemical details, or the like. In another embodiment, the remote server 130 may be configured to receive information from external sources as current usage related information, such as, and without limitation, information obtained from laboratory video feed, biometric information sources, company attendance system, etc.

At step 504, the remote server 130 retrieves the virtual stamp (V-stamp) associated with the unique identifier of the glassware 123 from the database 140. The V-stamp data is retrieved to extract the previously defined usage control information for the glassware 123, wherein the usage control information indicates the standard set of instructions/parameters in compliance with which the glassware 123 should be used.

At step 506, the remote server 130 processes the received current usage information and compares it with the usage control information/criteria defined in the virtual stamp to determine a triggering condition/action. The user may define the trigger condition while registering the glassware 123 or while defining the standard usage control parameters for the glassware 123. The trigger condition can include, but not limited to, usage of the glassware by an unauthorized user, exceeding the usage limit set for the glassware, violation of set time gap between the experiments performed by using the glassware, using glassware for forbidden chemicals as defined in the usage control information, and using glassware for more than the safe duration as specified in the usage control information, using glassware after expiry date, using glassware at unauthorized location, and so on.

At step 508, the remote server 130 triggers an action based on the processing of the received usage information with the usage control information defined in the virtual stamp. If the remote server 130 determines based on the comparison that the trigger condition is reached, it initiates an alarm indicating that the current usage information is in violation with the usage control information defined in the virtual stamp. For example, in an embodiment, the alarm may be triggered if the glassware has gone through a greater number of cycles than defined in the usage control information.

According to an embodiment of the present disclosure, the alarm may be sent in the form of a notification to one or more computing devices 120. The notification can be in the form of, but not limited to, an audible alarm, a visual alarm, a flash message, a pop-up message, multimedia message etc. Also, the alarm be sent to the authorized users of the computing devices 120. An administrator user may define the list of the authorized users, for example, who defines the usage control information for the glassware 123. For example, the administrator user 110 may also designate standard emergency personnel such as company administrator, quality manager, lab manager, ambulance operators, fire extinguisher operators as the default users to be contacted in case of an emergency situation as indicated by the alarm.

According to an embodiment of the present disclosure, the alarm may be sent to the mobile device, email address, fax numbers and so on as defined by the administrator user 110 or default preference set at the remote server 130.

In step 510, the remote server 130 updates the usage information history of the glassware 123, which is stored in the database 140, in accordance with the current usage information. The current usage information can include information related to, but not limited to, time, date, purpose, field of experiment, place, person in-charge of performing the experiment, chemical ingredients used, and so on. The current usage information can also include notes/comments input by the user related to the glassware 123. For example, the experiment conducted in a certain glassware 123 may be more crucial, and the user needs to monitor the experiment closely. Therefore, the user may also specify notes/comments related to the glassware 123 in the usage information.

In an alternate scenario, if the comparison of the received usage information with the control information defined in the virtual stamp does not result in a trigger condition, the received current usage information related to the usage is updated in the remote server 130. In an embodiment, the steps 510 can be performed before the execution of step 506 or 508 and the flowchart is are not intended to limit the scope of the disclosure. According to another embodiment of the present disclosure, the steps 508 and 510 can be performed in any order, depending on system's requirements. For example, the usage information history stored in the virtual stamp associated with the glassware in accordance with the current usage information may be updated prior to transmission of the alarm by the remote server 130. Therefore, these steps are interchangeable and are not intended to limit the scope of the disclosure.

At step 512, based on the user's request, the remote server 130, sends the usage information history stored in the virtual stamp associated with the glassware 123 to the user 110 of first computing device 120 or second computing device 120, wherein the first computing device 120 is the administrator's device which is used to define the standard usage control information for the glassware, and the second computing device 120 is experimenter's device who is currently performing the experiment. The usage control information can be presented on the graphical user interface of the requesting computing device 120 (e.g., the first computing device 120 or the second computing device 120). In an embodiment, the user 110 can request the remote server 130 to provide the usage information by using a suitably programmed computer program product executed by the processing unit 202 of the computing device 120.

In an embodiment, the usage history information may be presented in the form of a graph, a vein diagram, a pie chart, a bubble chart, or the like. The usage information can also be integrated with a voice assistant that elaborates the usage information to the user 110 of the computing device 120. A separate icon may be displayed on the user interface of the computing device 120 to start the audio explanation of the usage information.

Figure 6:
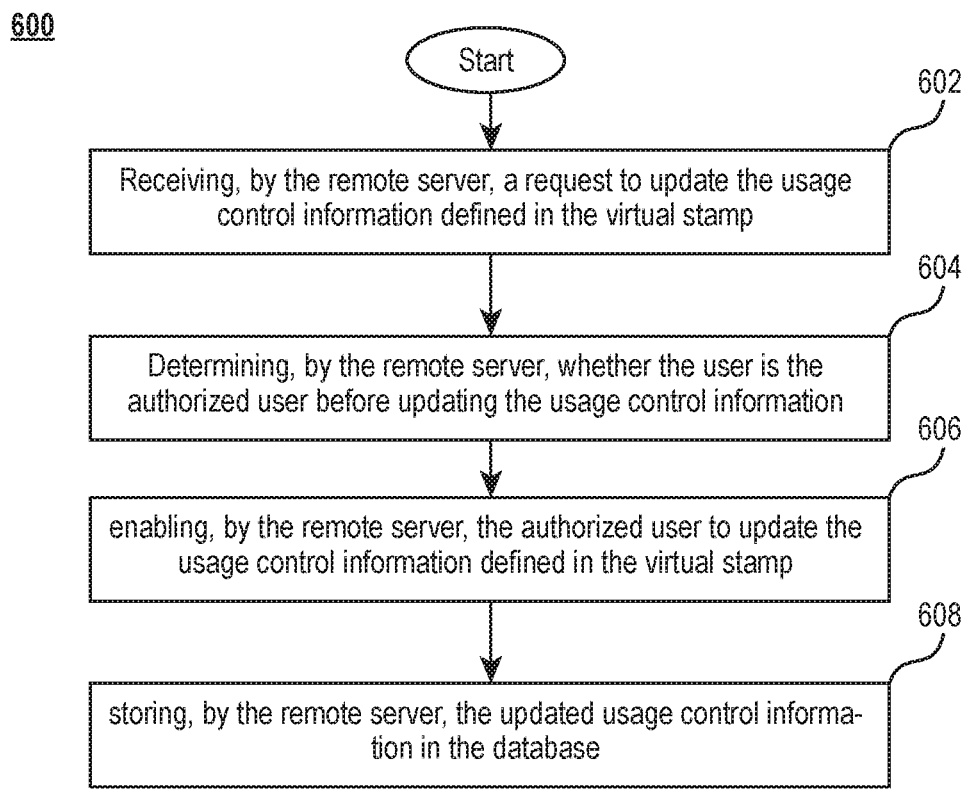
FIG. 6 is a flowchart illustrating an exemplary workflow for updating usage related information of the laboratory glassware defined in the virtual stamp according to an embodiment of the present disclosure.

The method for updating usage control information related to the laboratory glassware 123 defined in the associated virtual stamp is illustrated by flowchart 600 of FIG. 6. The process begins at step 602, wherein a user 110 requests the remote server to update the usage control information associated with the glassware 123. The user 110 can request the remote server 123 using the computing device 120. For example, the user may wish to update usage control information of the glassware 123 based on different parameters such as, but not limited to, usage limit, chemical or vaccine to be used in the glassware, experiments allowed to perform using the glassware, users authorized for the usage of the glassware, etc. In an embodiment of the disclosure, some parameters such as, but not limited to, glassware 123 expiry date of the glassware, permitted usage cycles or any other parameters that are defined by the manufacture of the glassware 123 may not be altered/updated by the user 110.

At step 604, the remote server 130, queries the user to present authentication information such as, and without limitation, username and password to authenticate the user. In another embodiment, the user may be verified automatically by comparing the device ID of the user's computing device. The information entered by the user 110 is compared with the stored information related to the user 110 in the database 140 of the remote server 130. Upon comparison, if the user is authorized to update the usage control information, the process proceeds to step 606.

At step 606, once authorized, the user is allowed to enter the information to update the usage control information related to the glassware 123. The user may input new parameters or modify existing details in the virtual stamp by using the computing device 120.

In step 608, Once the user modifies the usage control information 110, the updated information is stored in the database 140 of the remote server 130. The one or more data fields in the virtual stamp are updated according to the usage information entered by the user.

In an embodiment, the various versions (ongoing as well as old versions) of the virtual stamp reflecting the modifications performed in the usage control information over a period of time are stored in the database, which can be accessed by the authorized users.

In an embodiment of the present disclosure, the notification related to the updating of the usage control information in the virtual stamp may be sent to the user 110 of the computing device 120 and/or other users authorized by the user 110 or administrator to receive notifications in the virtual stamp. The notification may be sent according to the notifications means specified by the user 110 in the virtual stamp. Such an approach is useful to prevent unauthorized usage of the glassware 123 by illegally stealing the authentication information of the user 110.

The laboratory equipment according to the disclosure are devices which are used to carry out chemical, biochemical, biological or microbiological processes, such as syntheses, sample preparation and analyzes. As already mentioned, laboratory devices in the sense of the disclosure can be, for example, any type of sample dosing device, sample transport device, sample separation device, sample purification device, sample storage device, sample conversion device, sample testing device or sample analysis device.

As any unauthorized attempt made to access the glassware or information related to the glassware is effectively thwarted, the present disclosure provides an efficient way to group a batch of the glassware for a particular experiment or using the glassware with a particular chemical, vaccine, diagnosis, etc. Also, the present disclosure enables a highly efficient method for tracking the usage of glassware. Further, the inventory of glassware inside lab or testing facility can be managed with the help of present disclosure.

Although the present disclosure has been described in terms of certain preferred embodiments, various features of separate embodiments can be combined to form additional embodiments not expressly described. Moreover, other embodiments apparent to those of ordinary skill in the art after reading this disclosure are also within the scope of this disclosure. Furthermore, not all of the features, aspects and advantages are necessarily required to practice the present disclosure. Thus, while the above detailed description has shown, described, and pointed out novel features of the disclosure as applied to various embodiments, it will be understood that various omissions, substitutions, and changes in the form and details of the apparatus or process illustrated may be made by those of ordinary skill in the technology without departing from the spirit of the disclosure. The disclosures may be embodied in other specific forms not explicitly described herein. The embodiments described above are to be considered in all respects as illustrative only and not restrictive in any manner. Thus, scope of the disclosure is indicated by the following claims rather than by the foregoing description.

What is claimed is:

1. A computer implemented method for defining usage control of a glassware, the computer implemented method comprising:

receiving, by a remote server, a unique identifier associated with the glassware from a computing device, wherein the unique identifier is retrieved by the computing device by scanning a QR code associated with the glassware;

generating, by the remote server, a virtual stamp associated with the unique identifier of the scanned QR code associated with the glassware;

allowing, by the remote server, a user to define usage control information in the virtual stamp for controlled usage of the glassware; and storing, by the remote server, the virtual stamp comprising the defined usage control information for the glassware, in a database;

wherein the glassware is a laboratory glassware; and wherein the usage control information comprises one or more of information related to life cycle of the glassware, approved first use date of the glassware (start date), expiry date of the glassware (end date), shelf life of the glassware, allowed chemical details, forbidden chemical details, allowed usage cycles, maximum time duration of the experiment to be performed using the glassware, allowed operating parameters, forbidden operating parameters, glassware safe operating conditions, glassware tolerance information, glassware calibration information, precision level, and chemical/vaccine to be used in the glassware.

2. The computer implemented method of claim 1, further comprises determining, by the remote server, before generating the virtual stamp whether the scanned glassware is a new glassware by comparing the unique identifier with already stored information in the database.

3. The computer implemented method of claim 1, further comprises facilitating, by the remote sewer, locking of the glassware for a specific purpose in accordance with the usage control information of the virtual stamp associated with the glassware.

4. The computer implemented method of claim 1, further comprises:

determining, by the remote server, whether the user is an authorized user before allowing to define usage control information in the virtual stamp for the controlled usage of the glassware, wherein the user is determined as an authorized user if valid authentication details are provided by the user.

5. The computer implemented method of claim 1, further comprises:

receiving, by the remote server, a request to update the usage control information defined in the virtual stamp;

determining, by the remote server, whether the user is the authorized user before updating the usage control information, wherein the user is determined as an authorized user if the valid authentication details are provided by the user;

enabling, by the remote server, the authorized user to update the usage control information defined in the virtual stamp; and storing, by the remote server, the updated usage control information in the database.

6. A computer implemented method for enabling controlled usage of a glassware, the computer implemented method comprising:

receiving, by a remote server, a current usage information related to the glassware from a user through a computing device;

retrieving, by the remote server, a virtual stamp and associated usage control information stored in a database 140;

processing, by the remote server, the current usage information and the usage control information; and triggering, by the remote server, an action on the basis of the processing of the received current usage information with the usage control information defined in the virtual stamp;

wherein the glassware is a laboratory glassware; and wherein the usage control information comprises one or more of information related to life cycle of the glassware, approved first use date of the glassware (start date), expiry date of the glassware (end date), shelf life of the glassware, allowed chemical details, forbidden chemical details, allowed usage cycles, maximum time duration of the experiment to be performed using the glassware, allowed operating parameters, forbidden operating parameters, glassware safe operating conditions, glassware tolerance information, glassware calibration information, precision level, and chemical/vaccine to be used in the glassware.

7. The computer implemented method of claim 6, wherein the processing of the received current usage information comprises comparing the current usage information with the usage control information defined in the virtual stamp.

8. The computer implemented method of claim 6, further comprises facilitating, by the remote server, locking of the glassware for a specific purpose in accordance with the usage control information of the virtual stamp associated with the glassware.

9. The computer implemented method of claim 6, wherein the triggering of action comprises one or more of:
triggering, by the remote server, an alarm if the received current usage information is in violation with the usage control information defined in the virtual stamp, wherein the alarm is transmitted, by the remote server, to one or more computing devices defined in the virtual stamp which are authorized to receive notifications related to the glassware; and
updating, by the remote server, usage information history in the virtual stamp in accordance with the current usage information.

10. The computer implemented method of claim 6, wherein the current usage information also comprises a unique identifier associated with the glassware, wherein the unique identifier is retrieved by the computing device by scanning a QR code associated with the glassware.

11. The computer implemented method of claim 6, further comprises facilitating, by the remote server, the authorized user to modify the usage control information.

12. The computer implemented method of claim 6, further comprises providing, by the remote server, usage information history associated with the glassware based on a request of the user, wherein the request is made to the remote server through the computing device.

13. A system for enabling controlled usage of a laboratory glassware, the system comprising:
a plurality of computing devices;
a remote server, wherein the remote server is configured to perform at least:
receiving, by a remote server, a unique identifier associated with the laboratory glassware from a computing device, wherein the unique identifier is retrieved by the computing device by scanning a QR code associated with the laboratory glassware;
generating a virtual stamp associated with the unique identifier of the scanned QR code;
allowing an authorized user to define usage control information in the virtual stamp for the controlled usage of the laboratory glassware;
storing the virtual stamp, comprising the defined usage control information for the laboratory glassware, in a database;
receiving current usage information related to the laboratory glassware from a first computing device or a second computing device;
retrieving the virtual stamp stored in the database, wherein the virtual stamp is associated with the laboratory glassware;
processing, by the remote server, the received current usage information with the usage control information defined in the virtual stamp; and
triggering, by the remote server, an action on the basis of the processing of the received current usage information with the usage control information defined in the virtual stamp;
wherein the usage control information comprises one or more of information related to life cycle of the laboratory glassware, approved first use date of the glassware (start date), expiry date of the glassware (end date), shelf life of the glassware, allowed chemical details, forbidden chemical details, allowed usage cycles, maximum time duration of the experiment to be performed using the glassware, allowed operating parameters, forbidden operating parameters, glassware safe operating conditions, glassware tolerance information, glassware calibration information, precision level, and chemical/vaccine to be used in the glassware.

14. The system of claim 13, wherein the remote server facilitates the authorized user to modify the usage control information.

15. The system of claim 13, wherein the remote server provides a usage information history associated with the laboratory glassware based on a request of the first computing device or the second computing device.

16. The system of claim 13, wherein the processing of the received current usage information comprises comparing the current usage information with the usage control information defined in the virtual stamp.

17. The system of claim 13, wherein triggering the action further comprises at least one of:
triggering, by the remote server, an alarm if the received current usage information is in violation with the usage control information defined in the virtual stamp, wherein the alarm is transmitted, by the remote server, to one or more computing devices defined in the virtual stamp which are authorized to receive notifications related to the glassware;
updating, by the remote server, usage information history in the virtual stamp in accordance with the current usage information; and
enabling, by the remote server, the authorized user to update the usage control information defined in the virtual stamp.

* * * * *